US008085981B2

(12) United States Patent
Godon et al.

(10) Patent No.: US 8,085,981 B2
(45) Date of Patent: Dec. 27, 2011

(54) OBJECT PERCEPTION METHOD AND A RELATED PERCEIVING DEVICE

(75) Inventors: Marc Bruno Frieda Godon, Londerzeel (BE); Koen Handekyn, Lochristi (BE); Rony Alfons Maria Baekeland, Antwerp (BE); Lieven Leopold Albertine Trappeniers, Noorderwijk (BE); Hendrik Eugene Irene Nicolas Dacquin, Ghent (BE); Jan Alfons Albert Bouwen, Antwerp (BE)

(73) Assignee: Alcatel Lucent, Paris (FR)

( * ) Notice: Subject to any disclaimer, the term of this patent is extended or adjusted under 35 U.S.C. 154(b) by 853 days.

(21) Appl. No.: 11/395,219

(22) Filed: Apr. 3, 2006

(65) Prior Publication Data

US 2006/0227994 A1 Oct. 12, 2006

(30) Foreign Application Priority Data

Apr. 6, 2005 (EP) .................................... 05290778

(51) Int. Cl.
*G06K 9/00* (2006.01)

(52) U.S. Cl. ........ 382/103; 382/100; 382/128; 709/217; 709/245

(58) Field of Classification Search .................. 382/100, 382/128, 103, 168; 705/16, 26, 27, 14; 701/213, 701/200, 214, 215
See application file for complete search history.

(56) References Cited

U.S. PATENT DOCUMENTS 6,604,049 B2 * 8/2003 Yokota .......................... 701/213
7,103,472 B2 * 9/2006 Itabashi ........................ 701/200
7,324,959 B2 * 1/2008 Malkin et al. .................... 705/16
7,399,220 B2 * 7/2008 Kriesel et al. ................. 452/157
7,610,123 B2 * 10/2009 Han et al. ......................... 701/14
7,616,124 B2 * 11/2009 Paessel et al. ............. 340/573.3
7,624,162 B2 * 11/2009 Clough et al. ................ 709/220
2002/0184332 A1 * 12/2002 Kindberg et al. ............. 709/217

OTHER PUBLICATIONS

Capio Pro G3- The Intelligent Choice for Business Imaging, [Online] May 29, 2003, XP002340631 Retrieved from the Internet: URL:www.ricoh.com> [retrieved on Aug. 13, 2005].*
Barton "Sensor-enhanced Mobile Web Clients: an Xforms Approach" WWW 2003-ACM 1-58113-680-3/03/0005, May 24, 2003, pp. 80-89, XP002340581 Budapest, Hungary.*

(Continued)

*Primary Examiner* — Vikkram Bali
*Assistant Examiner* — Nancy Bitar
(74) *Attorney, Agent, or Firm* — Fay Sharpe LLP

(57) ABSTRACT

The present invention relates to an object perception method, for use by a perceiving device that is adapted to perceive at least one object in an environment comprising a plurality of objects. Each object of the plurality of objects is adapted to provision meta-information characterizing the corresponding object. The perceiving device includes at least one object of the plurality of objects in a selection by varying a perspective of the object perceiving device. The perceiving device perceives this at least one object of the plurality of objects included in the selection and captures a representation of the at least one object included in said selection in a snapshot. The perceiving device further perceives meta-information corresponding to the at least one object in the selection and additionally the meta-information corresponding to the objects of said plurality of objects not included in the selection. The perceiving device then captures in the snapshot additionally to the representation of the at least one object included in the selection, the meta-information corresponding to the at least one object in the selection, said meta-information corresponding to said objects not included in said selection.

20 Claims, 2 Drawing Sheets

OTHER PUBLICATIONS

Barton: "Sensor-enhanced Mobile Web Clients: an XForms Approach" WWW 2003-ACM 1-58113-680-3/03/0005, May 24, 2004, pp. 80-89, XP002340581. Budapest, Hungary.

Capio Pro G3: "The Intelligent Choice for Business Imaging, 'Online!" May 29, 2003, XP002340631, Retrieved from Internet: URL: www.ricoh.com.

Kindberg: "Implementing Physical Hyperlinks Using Ubiquitous Identifier Resolution" International World Wide Web Conference, Proceedings of the 11$^{th}$ International Conference on World Wide Web, Dec. 31, 2002, pp. 191-199, XP008051094, Honolulu, Hawaii.

"Distributing Uniform Resource Locators as Bar Code Images" IBM Technical Disclosure Bulletin, IBM Corp. New York, US, vol. 39, No. 1, 1996, p. 167, XP000556360.

Fleck M, Frid M, Kindberg T, O'Brien -Strain E, Rajani R, Spasojevic M: "From Informing to Rembering: Ubiquitous Systems in Interactive Museums" IEEE Pervasive Computing, pp. 13-21, XP002341122.

* cited by examiner

OBJECT PERCEPTION METHOD AND A RELATED PERCEIVING DEVICE

The present invention relates to an object perception method as described in the preamble of claim 1 and a related perceiving device as described in the preamble of claim 4.

Such a method and related devices are already known in the art, e.g. from the Ricoh Caplio Pro G3 Camera/GPS flyer also published at http://www.ricoh.co.jp/r_dc/dc.

Therein a perceiving device, called a Ricoh Caplio Pro G3 Camera/GPS further referred to as digital camera is described. This perceiving device is adapted to perceive objects in an environment comprising a plurality of objects. These objects are able to provision meta-information that characterises the corresponding object. The perceiving device, called digital camera, includes objects of the plurality of objects in a viewing selection by varying a perspective, called zooming in or out with the optical lens of the perceiving device. The perceiving device views the objects included in the selection made by the chosen focal distance of the optical lens and/or the standpoint of the user of the perceiving device. Additionally, the perceiving device perceives meta-information, which is related to the perceiving device itself such as location information of the camera, i.e. the position where a picture including the selected objects is made, the current time and the current date.

This information may just be viewed through the perceiving device, but may additionally be captured in a snapshot, called a digital picture including all objects in view selected in function of the zoom and the standpoint of the camera.

Disadvantageous of such perceiving device is that the perceivable objects can be perceived through such a perceiving device and eventually captured without including any information concerning the context of the perceivable and captured objects.

An object of the present invention is to provide a perceiving method and a related perceiving device of the above known type but wherein besides the selected objects additional meta-information characterising the entire environment of the perceiving device is captured.

According to the present invention, this object is achieved by the object perceiving method as described in claim 1 and the perceiving device as described in claim 4.

Indeed, by the perceiving device, perceiving meta-information corresponding to the at least one object included in the selection and additionally perceiving meta-information corresponding to the objects of the plurality of objects not included in the selection and in addition to perceiving this information also annotating a snapshot (comprising the captured representation of the at least one object included in the selection, by additionally capturing in the snapshot, the meta-information corresponding to the at least one object in the selection and the meta-information corresponding to the objects not included in said selection.

In this way a representation of objects in a selection, referred to as the snapshot, picture or recording, is annotated with information that characterises the environment of the objects in selection.

Another characterizing embodiment of the present invention is described in the method according to claim 2 and the perceiving device according to claim 5.

The perceiving device PD additionally is adapted to perceive meta-information related to a user of the perceiving device and to additionally capture the meta-information related to the user in the snapshot.

Another characterizing embodiment of the present invention is described in the method according to claim 3 and the perceiving device according to claim 6.

The Object perceiving device PD additionally is adapted to perceive meta-information related to the perceiving device and capturing said meta-information related to said perceiving device in said snapshot. This meta-information may amongst others be the world coordinates of the location of the perceiving device, the current time, the current temperature etc.

It is to be noticed that the term 'comprising', used in the claims, should not be interpreted as being restricted to the means listed thereafter. Thus, the scope of the expression a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
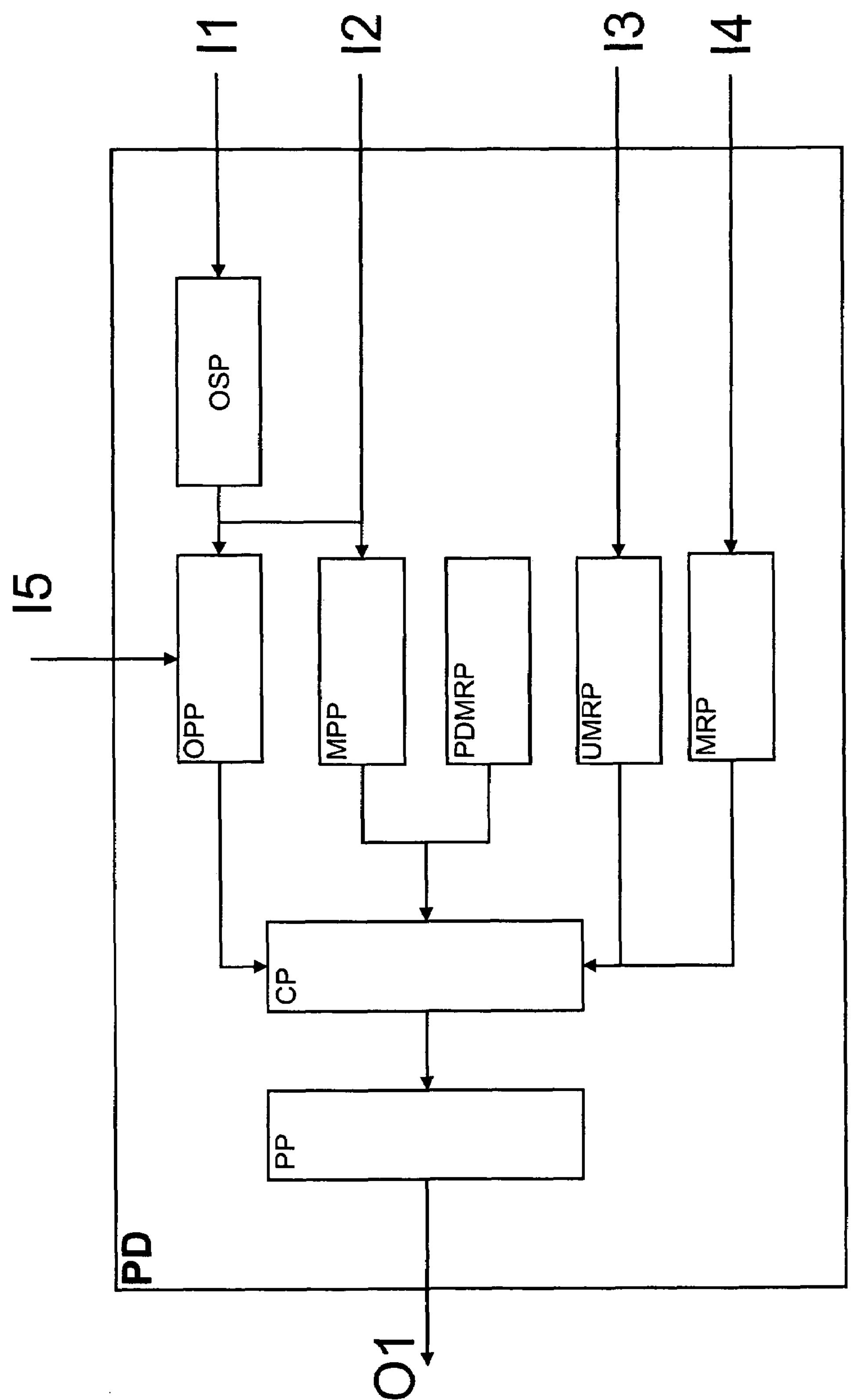
FIG. 1 represents a perceiving device PD of the present invention.

In the following paragraphs, referring to the drawings, an implementation of the perceiving device PD will be described. In the first paragraph of this description the main elements of the perceiving device PD as presented in FIG. 1 are described. In the second paragraph, all connections between the before mentioned elements and parts are defined. In the succeeding paragraph the actual execution of the present invention by means of the perception device PD is described.

The perceiving device PD that is adapted to perceive at least one object in an environment comprising a plurality of objects wherein the objects of the plurality of objects are able to provision meta-information characterising the corresponding object. Such a perceiving device PD may be a special fotocamera, a special video camera for recording sound and vision or a special audio recorder. The perceiving device PD comprises an object perceiving part OPP that is adapted to perceive the at least one objects of the plurality of objects included in the selection. This object perceiving part OPP of the perceiving device may be the optical lenses of the camera or the microphone array of the audio recorder or a combination thereof.

The perceiving device PD further comprises an object selection part OSP that is able to include the at least one object of the plurality of objects in a selection by varying a perspective of the object perceiving device PD. The perspective maybe determined by the focal distance of the lenses, the position and standpoint of the user of the camera, and/or the configuration of the microphone array.

The object perception device PD additionally comprises a meta-information perceiving part MPP, that is adapted to perceive the meta-information corresponding to the at least one object in the selection. This meta-information perceiving part MPP may be a wireless transmitter/receiver enabling a real-time message based objects meta-information exchange communication protocol (for example based on W3C Web Ontology Language, RDF, HTTP, or WiFi). The meta-information perceiving part MPP can use a request/response messaging communication model (a local broadcast) to collect all meta-information of the objects within the neighbourhood of the perception device PD (including at least an unique object identifier, world coordinates of the object location, and a real-time stamp indicating the age of the meta-information) and corresponding extended meta-information of the surrounding objects. The meta-information perceiving part MPP uses the received world coordinates of the locations of the responding objects, the real world coordinates of the location of the perceiving device, and for example the perspective definition of the perceiving device to define which of the responding objects are within the perspective of the perceiving device. For example, the visual perspective is defined by the lens specifications, a three dimensional directional vector representing the viewing direction (in aviation this is defined by the attitude and the compass direction) and the position of the perceiving device. The user can for example adjust the focal length and aperture of the visual apparatus of the perceiving device to adjust the focus and depth of field within the visual perspective and can for example visually focus on at least one of the objects within the previous selection. The user can then browse the received meta-information of the selected object, using the meta-information browser from the perceiving device.

As an example of embodiment the user experience of browsing visually object meta-information can be as follows. When the user is looking through the visual seeker of perception device PD, the user sees in overlay some visual markers in the seeker view indicating the presence of available meta-information of objects within the current view. The perception device PD could be equipped with a pointing/selection device. When the user points to one of the visual markers some minimal object meta-information as for example only the name will be shown in overlay. Of course it is not unlikely that this can be a default setting to show always the object names in overlay in the seeker view. When the user selects the pointed marker, in the seeker view, more meta-information can be shown visually such as for example a selectable URL link to further information to enable the browsing of object related meta-information beyond or before the depth of field of the current seeker view; or to be able to browse meta-information on objects which are currently not visible in the seeker view, the user can use the selection slider of the perception device PD. In this way the presence of objects can come into notice of the user, their meta-information, and for example their location and distance in reference to the location of the perception device PD. Of course this user experience is not limited by the usage of the equipped visual seeker of the perception device PD. It is not unlikely that the perception device PD is also equipped with an extra small screen or at least a larger screen can be connected to. The same is applicable if for the audio aspects of the experience. For example, surrounding objects could give the user the impression that they whisper the direction indications.

As an example, a portable radio includes at least the following meta-information: the portable radio unique object identifier, the world coordinates of the location the portable radio, a real-time stamp indicating the age of the meta-information, current audio source (radio station, CD, cassette, etc.) and current song playing. Additional information can be queried as described further returning for example control URLs to switch audio source, URLs to the current station, URLs to the web site of the songwriter, etc.

Browsing meta-information of perceived objects is not limited to objects that can be visually experienced. All objects, from which meta-information can be received, within the visual perspective definition and within the horizon are candidates for selection. Examples are information sources like virtual post-it notes, audio sources, etc.

It is to be noted that the meta-information perceiving part MPP also may support a spontaneous broadcast communication protocol. In this way moving objects can be perceived. It is evident that the meta-information received comprises information of the object's physical context such as for example speed vector, acceleration vector, etc.

The meta-information receiving part MRP, in turn is able to receive the meta-information corresponding to the objects of the plurality of objects not included in the selection This meta-information receiving part MRP may be a wireless transmitter/receiver enabling a real-time message based object meta-information exchange communication protocol (for example based on W3C Web Ontology Language, HTTP, and WiFi). The meta-information receiving part MRP may use a request/response messaging communication model to collect all meta-information of the surrounding objects, comprising at least: the unique object identifier, the object world coordinates of the object location, and a real-time stamp indicating the age of the meta-information.

Furthermore the object perceiving device PD contains a user meta-information reception part UMRP that is adapted to perceive meta-information related to a user of the perceiving device. The user meta-information reception part UMRP may be a wireless transmitter/receiver enabling a real-time message based objects meta-information exchange communication protocol (for example based on W3C Web Ontology Language, HTTP, and WiFi). The UMRP can use a request/response messaging communication model to collect meta-information of the user of the camera, which may be the user heartbeat frequency, the user body temperature, and for example the user person identity.

The perceiving device meta-information reception part PDMRP adapted to perceive meta-information related to said perceiving device. This meta-information could comprise at least for example the world coordinates of the location of the perceiving device retrieved via for example an equipped Global Position System module including for example the current altitude of the perceiving device, for example the object identification of the perceiving device, environment properties at current location perceived via for example the equipped temperature, atmospheric pressure, and humidity sensors, etc. The perceiving device meta-information reception part PDMRP provides also the capturing part CP meta-information related to the assembly of the perception device PD as a whole, the parts within the assembly said perception device PD, the relationships between the parts together with the meta-information on the constraints and capabilities of the parts and relationships of the assembly said perception device PD. The perceiving device meta-information reception part PDMRP provides also the capturing part CP meta-information on current calendar and current time according to the current location. Real-time stamps indicate the age of the respective meta-information.

The perception device further comprises a capturing part CP that is able to capture in a snapshot, a representation of the at least one object included in the selection and in addition thereto to capture in this snapshot the meta-information corresponding to the at least one object in the selection and the meta-information corresponding to the objects not included in the selection. The capturing part CP may optionally be adapted to capture the meta-information related to the user of the perceiving device and the meta-information related to the perceiving device PD in the snapshot.

Moreover there is a processing part PP that is able to process the snapshot corresponding to the presentation of the at least one object in the selection. The processing part PP may be a storing part for storing the snapshot. The processing part PP alternatively may be a forwarding means that is able to forward the snapshot towards for instance to a home computer having storage media, another user or another camera. This may be done using WiFi-, GSM, RFID-communication or any other suitable communications-technology.

Alternatively, the processing part may be a browsing device for, for instance browsing the Internet based on URL information included in the meta-information of a certain object.

The object selection part OSP has an output that is coupled to an input of the object perceiving part OPP and at the same time coupled to an input of the meta-information perceiving part MPP. Each of the following parts, object perceiving part OPP, the meta-information perceiving part MPP, the meta-information receiving part MRP the perceiving device meta-information reception part PDMRP and the user meta-information reception part UMRP are coupled with an output to an input of the capturing part CP. The capturing part CP further has an output that is coupled to an input of the processing part PP. The processing part PP in turn has an output that is at the same time an output-terminal O1 of the perceiving device PD.

The object selection part OSP has an input that is at the same time an input-terminal 11 of the perceiving device PD. This input-terminal may receive user control information for controlling the perspective. The metainformation perceiving part MPP has an input that is at the same time an input-terminal 11 of the perceiving device PD. This input-terminal may receive meta-information sent by the object within the selection of the object perceiving part OPP. Furthermore, the meta-information receiving part MRP and the user meta-information reception part UMRP respectively have inputs that are coupled to the respective input-terminals 13, 14 of the perceiving device. The information received on input-terminal 13 comprises information that is related to the user of the perceiving device. Further the information received on input-terminal 14 comprises meta-information relating to objects that are not included in the selection. The object perceiving part OPP has an input that is at the same time an input-terminal of the perceiving device PD. This input-terminal of the perceiving device represents the entry of information with regard to the real world, i.e. the visual representation of the objects in selection of the object perceiving part OPP or the sound directed to by the object perceiving part OPP.

Figure 2:
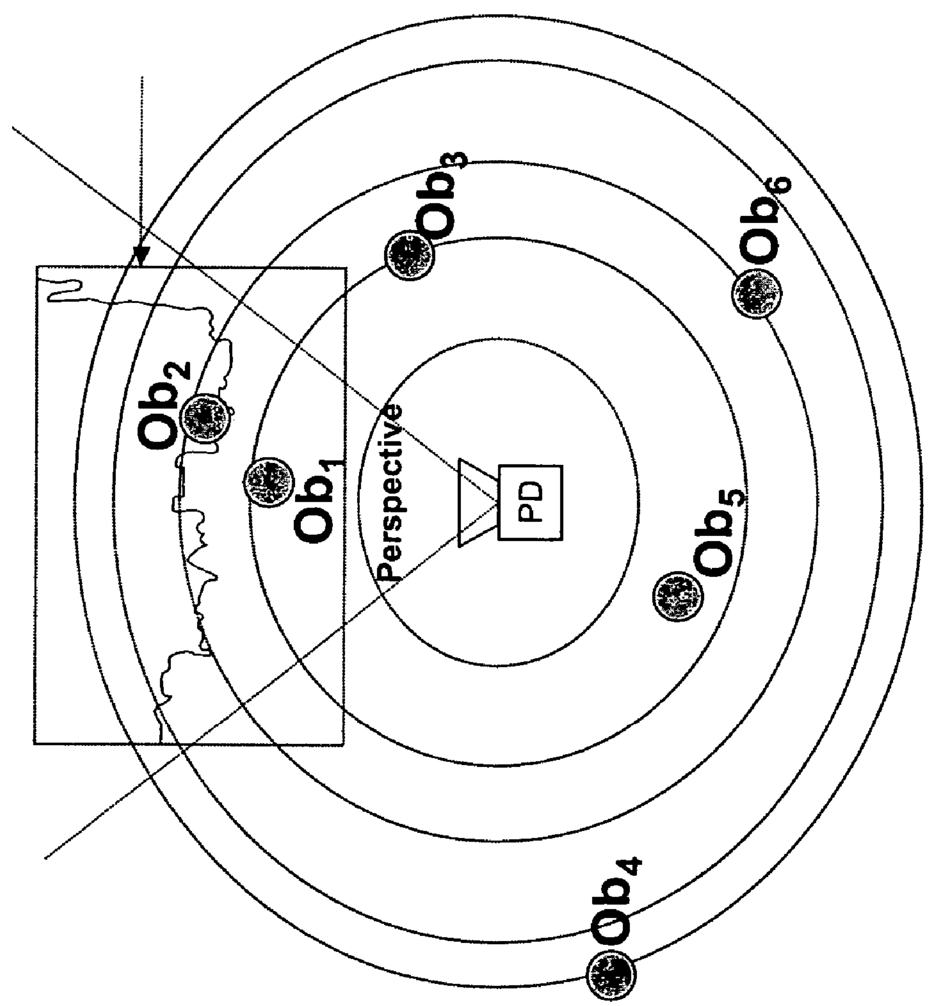
FIG. 2 represents an environment wherein the perceiving device PD of the present is used.

In order to explain the present invention it is assumed that a perception device is used in an environment as presented in FIG. 2 wherein a number of objects $Ob_1 \ldots Ob_6$ are present around the perception device PD.

Each of the objects $Ob_1 \ldots Ob_6$ is assumed to be able to provision meta-information with respect to this object. This meta-information may contain a description of the object such as the unique object identifier, the world coordinates of the object location, a real-time stamp indicating the age of the meta-information, an additional information URL, control URLs, etc.

The object selection part OSP of the perception device PD is able to include objects of the plurality of objects in the selection as viewed by the perceiving device PD by varying a perspective of said object perception perceiving device. The perspective here amongst others is determined by de focal distance of the lenses of the perception device PD, from the standpoint of the user, the viewing direction and the viewing angle. For supporting an accurate definition of the viewing direction at a certain location and altitude, the perception device PD can be equipped with several sensor instruments to define the tilt, pan, banc or roll properties of the perception device PD influencing the viewing direction in reference to the world coordinate system. For the viewing direction As is shown in FIG. 2 the perspective is varied in such way that object $Ob_1$ and $Ob_2$ are included in the selection and hence can be viewed through the perception device PD by means of the an object perceiving part OPP that is the able to perceive the objects $Ob_1$ and $Ob_2$.

The meta-information perceiving part MPP further is able to view the meta-information corresponding to the selected object $Ob_1$ and $Ob_2$. For object $Ob_1$ being a castle the meta-information may be name of the castle, age of the castle, visiting hours, and URL for more information and objects $Ob_2$ being a hotel having meta-information which may comprise the URL of the website related to the specific hotel. The user of the perception device PD may browse this website and interact with the website by means of the processing part PP.

The objects $Ob_3$ to $Ob_6$ may for instance respectively be a statue $Ob_3$, a traffic sign $Ob_4$, a person with a similar perceiving device $Ob_1$, and a printer capable printing photos in a shop $Ob_6$. In case objects $Ob_3$ to $Ob_6$ are not selected the meta-information perceiving part MPP and the meta-information receiving part MRP will receive meta-information. In case objects $Ob_3$ to $Ob_6$ are selected more information corresponding on the selected object, can be received by means of the meta-information perceiving part MPP, to be viewed. For the statue $Ob_3$ we could be notified about: the style of the statue, the subject, date of creation, the material in which it was sculptured, the name of the artist, and an extra URL for more information. It is not unlikely that we receive a control URL. A control URL is a URL pointing back to the selected object encoding commands and parameters for example, in a Web Service like approach (see W3C Web Service Architecture). Selecting a control URL could result in switching on/off lights in order to obtain better lighting of the statue for making pictures in the dark. It is not unlikely that an URL is provided to access extra multi-media based information, for example to give access to a short explanation on the historical background of the statue (text, pictures, sound and/or video). These multi-media artefacts can be downloaded via a local access point in the neighbourhood and can be (re) played by means of the processing part PP of the same perceiving device PD. It is not unlikely that an option is provided to send references to these artefacts via email (for example to use these in a photo holiday show later at home). For the traffic sign $Ob_4$ we could receive extra meta-information related to the meaning of the message of the sign, the phone number of the responsible in case of problems, the phone number of the nearest police station, an URL for further info (e.g. providing access to an elementary traffic sign course). For the person with the similar perception device $Ob_5$ we could receive name, emotional state, communication references (address, phone number, GSM number), age, profession, URL to the person's web page, URL giving access to the photographs locally stored in the perceiving device, or give access to the values of perception, horizon, and focus definitions currently in use by the other perception device. It is not unlikely that access is provided to the meta-information available in the other perceiving device. For the case of the photo printer in the shop $Ob_6$ it is likely to receive meta-in formation about the major properties of the photo printer and likely to have access to for example the name of the shop, opening hours, price per print, communication properties of the contact person such name, address, phone number, GSM number, etc.

The exchange of meta-information between object $Ob_1$ and $Ob_6$ and the perceiving device PD, the meta-information perceiving part MPP, and the meta-information receiving part MRP, can be elaborated as example of embodiment as follows.

All objects $Ob_1$ to $Ob_6$ broadcast un-solicited notification messages, at a regular time interval, containing meta-information. This meta-information comprises for example at least the following meta-information: an identifier indicating the purpose of the message said un-solicited notification messages, an unique object identifier of the originator of the message, world coordinates of the location of the originating object of the message, and a real-time stamp indicating the time the message was send.

Both meta-information perceiving part MPP and meta-information receiving part MRP can receive and handle these un-solicited notification messages containing meta-information.

The meta-information perceiving part MPP can set-up a specific real-time communication session with a selected object for requesting for example extra meta-information. This can be achieved via broadcasting un-solicited request messages comprising at least for example the following information: an identifier indicating the purpose of the un-solicited request messages, an extra meta-information request specification, a communication session identifier defined by the meta-information perceiving part MPP, a real-time stamp indicating the time the message was originated, the object identifier of the targeted object for communication, the world coordinates of the location of the targeted object known by the meta-information perceiving part MPP at the moment the message was originated, the object identifier of the originator of this message which is in this case for example the object identifier of perception device PD, and the world coordinates of the location of the perception device PD at the moment the message was originated.

The targeted object, meaning the object with the same object identifier as the object identifier of the targeted object for communication as described in the received un-solicited request message, will provide the extra meta-information requested by as for example the meta-information perceiving part MPP. The targeted object will use as response a broadcast of a solicited response message containing at least for example the following information: an identifier indicating the purpose of the solicited response messages, the object identifier of the perception device PD as the targeted object for the communication, the known world coordinates of the location of the originating object of the un-solicited request message at the moment the solicited response message was originated, the object identifier of the responding object as originator of the communication, the world coordinates of the location of the originating object, the session identifier from the previous received un-solicited request messages as communication context, a real-time stamp indicating the time the message was originated, and the requested extra meta-information.

The meta-information perceiving part MPP is able to discard un-solicited notification messages, un-solicited request messages, or solicited response messages on the basis of investigating for example of the object identifier of the targeted object for communication or the communication session identifier.

The meta-information receiving part MRP is able to discard un-solicited notification messages, un-solicited request messages, or solicited response messages on the basis of investigating for example the object identifier of the targeted object for communication, the identifier indicating the purpose of the message, the communication session identifier, the presence of a request formulation for extra meta-information, or the presence of extra meta-information.

The perception device PD can perceive meta-information. This meta-information corresponding to the objects $Ob_1$ to $Ob_6$ may be sent to the perception device PD using wireless communication technology transporting for example messages encoded using an W3C Web Ontology Language (OWL) or an W3C RDF based description (Resource Description Framework) or any other means for describing knowledge.

The Object perception device PD additionally may also comprise a user meta-information reception part UMRP that is adapted to perceive meta-information related to the user of the perceiving device. This meta-information may include the heartbeat frequency, the blood pressure, the body temperature; the person identification witch may be detected by dedicated sensors or provided by local body networked appliances.

The perception device further contains a capturing part CP that is adapted to capture in a "snapshot" a representation of the objects $Ob_1$ and $Ob_2$ selected from all objects $Ob_1$ to $Ob_6$ included in the selection made by the object selection part OSP. The capturing part CP further includes in the snapshot additionally to the representation of the objects $Ob_1$ and $Ob_2$, the meta-information corresponding to the objects $Ob_1$ and $Ob_2$ and the meta-information corresponding to the objects not included in said selection.

It is clear that there is more meta-information with respect to the objects in selection $Ob_1$ and $Ob_2$, available to the capturing part CP and thus more meta-information corresponding to these objects can be stored in snapshot. Nevertheless a minimum of meta-information with respect to the objects $Ob_1$ to $Ob_6$ will be available to the capturing part CP and consequently stored in the snapshot.

This could comprise at least for example, the unique name of the castle (see $Ob_1$), the unique name of the hotel (see $Ob_2$), the unique name of the statue (see $Ob_3$), the unique name of the traffic sign (see $Ob_4$), the unique name of the person (see $Ob_5$), and the unique name of the photo printer (see $Ob_6$) together with the world coordinates of the locations of the respective objects.

If the meta-information comprises names, the capturing part will render names in the context of the snapshot unique in case duplicates occur.

Furthermore, the perceived meta-information related to a user of the perceiving device as perceived by the user meta-information reception part UMRP may additionally be incorporated in the snapshot by the capturing part CP together with some meta-information of said perceiving device. This meta-information of the perceiving device may be the location of the device based on a Global Position System module incorporated in the perceiving device, the current time, the current temperature at location, the altitude, the atmospheric pressure, etc., as perceived by the perceiving device meta-information reception part PDMRP.

It is to be noted that the representation of the objects in the selection may additionally comprise the recorded sound in case of a video recording.

It is further to be noted that the meta-information perceiving part MPP could comprise the use of a directional antenna supporting the communication with the at least one objects corresponding to the selection of the perceiving device made by the object selection part OSP. In this case, it is not required that objects send out there world coordinates in the metainformation as the device knows about the objects in selection by nature of the means of communication, i.e. objects that are within the directional communication area are within. Also, that the meta-information receiving part MRP could comprise an omni-directional antenna supporting the communication with at least one of the objects not corresponding the selection of the perceiving device made under control of the object selection part OSP.

It is to be noted that the meta-information perceiving part MPP could comprise session communication management related to the communications to retrieve the extra meta-information from the at least one objects corresponding the selection of the perceiving device while the means of the meta-information receiving part MRP retrieves un-solicited and solicited basic meta-information related to objects not included in the selection.

Further it is to be noted that the PD can host several higher level applications. The above described capabilities enable a broad range of specific applications that can be hosted inside the PD. It is not unlikely that the user could get visual feedback in overlay in the visual seeker, about which direction to follow and how far to go to these objects physically. The visual feedback can be composed of compass indications, horizon indications related to the perception device PD attitude in reference to the world coordinate system, Global Position System coordinates of the current location of the perception device, direction to follow indications all this based on possible perception device PD equipped sensors. It is not unlikely that surrounding objects visible or not in the current seeker view give extra information and/or visual feedback to support the user moving to the selected object of interest. An example of such collaboration could be that the user gets route information to follow using street plans etc.

Another example of usage is an application where the end user gets remote haptic (touch, motion, etc) feedback to the objects observed, similar to the application of force feedback in game consoles. In this case the objects send specific meta-information about there haptic feedback experience while our perceiving device PD is equipped with appropriate feedback components.

It's also to be noted that the implementer can integrate the described solution with any available security mechanism to provide a to his needs secured infrastructure.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. An object perception method for a perceiving device comprising:

a plurality of objects in an environment each provisioning meta-information characterizing said corresponding object, said perceiving device including at least one object of said plurality of objects in a selection by varying a perspective of said object perceiving device;

said perceiving device perceiving said at least one object of said plurality of objects included in said selection;

said perceiving device capturing a representation of said at least one object included in said selection in a snapshot;

said perceiving device perceiving said meta-information provisioned by and corresponding to said at least one object in said selection;

said perceiving device perceiving said meta-information provisioned by and corresponding to said objects of said plurality of objects not included in said selection; and said perceiving device capturing in said snapshot, additionally to said representation of said at least one object included in said selection, said meta-information corresponding to said at least one object in said selection and said meta-information corresponding to said objects not included in said selection.

2. The object perception method according to claim 1, further comprising said perceiving device perceiving meta-information related to a user of said perceiving device and capturing said meta-information related to said user in said snapshot.

3. The object perception method according to claim 1, further comprising said perceiving device perceiving meta-information related to said perceiving device and capturing said meta-information related to said perceiving device in said snapshot.

4. An object perceiving device perceiving at least one object in an environment having a plurality of objects each provisioning meta-information characterizing said corresponding object, said object perceiving device (PD) comprising:

an object selection part (OSP) including at least one object of said plurality of objects in a selection by varying a perspective of said object perceiving device (PD);

an object perceiving part (OPP) perceiving said at least one object of said plurality of objects included in said selection;

a meta-information perceiving part (MPP) perceiving meta-information provisioned by and corresponding to said at least one object in said selection;

a meta-information receiving part (MRP) receiving meta-information provisioned by and corresponding to said objects of said plurality of objects not included in said selection; and a capturing part (CP) capturing in a snapshot a representation of said at least one object included in said selection and said meta-information corresponding to said at least one object in said selection and said meta-information corresponding to said objects not included in said selection.

5. The object perceiving device (PD) according to claim 4 further comprising a user meta-information reception part (UMRP) perceiving meta-information related to a user of said perceiving device, wherein said capturing part (CP) captures said meta-information related to said user of said perceiving device in said snapshot.

6. The object perceiving device (PD) according to claim 4 further comprising a perceiving device meta-information reception part (PDMRP) meta-information related to said perceiving device, wherein said capturing part (CP) captures said meta-information related to said perceiving device in said snapshot.

7. The object perception method according to claim 1 wherein the perception device is at least one of a digital camera, a video camera, and an audio recorder.

8. The object perception method according to claim 1 further comprising each of said plurality of objects provisioning said perceiving device with said meta-information using wireless communication technology.

9. The object perception method according to claim 8 wherein said wireless communication technology uses a real-time message based object meta-information exchange communication protocol including at least one of W3C Web Ontology Language, HTTP, and WiFi.

10. The object perception method according to claim 1 wherein the meta-information provisioned by each of said plurality of objects includes one or more of a unique object identifier, world coordinates of the object's location, a real-time stamp indicating the age of the meta-information, an additional information URL and a control URL.

11. The object perceiving device (PD) according to claim 4 wherein the object perceiving device (PD) is at least one of a digital camera, a video camera, and an audio recorder.

12. The object perceiving device (PD) according to claim 4 wherein said meta-information receiving part (MPP) further comprises a wireless transmitter/receiver receiving said provisioned meta-information.

13. The object perceiving device (PD) according to claim 12 wherein said wireless transmitter/receiver uses a real-time message based object meta-information exchange communication protocol including at least one of W3C Web Ontology Language, HTTP, and WiFi.

14. The object perceiving device (PD) according to claim 12 wherein said wireless transmitter/receiver receives unsolicited notification messages broadcast by said plurality of objects.

15. The object perceiving device (PD) according to claim 4 wherein the meta-information provisioned by each of said plurality of objects includes one or more of a unique object identifier, world coordinates of the object's location, a real-time stamp indicating the age of the meta-information, an additional information URL and a control URL.

16. The object perceiving device (PD) according to claim 4 further comprising a processing part processing said snapshot of the at least one object in the selection, the processing part including at least one of a storing part for storing the snapshot, a forwarding means having communications technology for forwarding the snapshot and a browsing device for browsing the Internet based on URL information included in the meta-information of an object.

17. The object perception method according to claim 1 further comprising:

said perceiving device setting up a specific real-time communication session with a selected object for requesting extra meta-information via broadcasting un-solicited request messages; and said selected object broadcasting a solicited response message including the requested extra meta-information.

18. The object perceiving device (PD) according to claim 4 further comprising said meta-information perceiving part (MPP) setting up a specific real-time communication session with a selected object for requesting extra meta-information via broadcasting un-solicited request messages and receiving a broadcasted solicited response message from the selected object including the requested extra meta-information.

19. An object perceiving device (PD) perceiving at least one object in an environment having a plurality of objects each provisioning meta-information characterizing said corresponding object, said perceiving device (PD) comprising:

an object selection part (OSP) including at least one object of said plurality of objects in a selection by varying a perspective of said object perception perceiving device;

an object perceiving part (OPP) perceiving said at least one object of said plurality of objects included in said selection;

a meta-information perceiving part (MPP) perceiving meta-information provisioned by and corresponding to said at least one object in said selection and setting up a specific real-time communication session with a selected object for requesting extra meta-information via broadcasting an un-solicited request message;

a meta-information receiving part (MRP) receiving meta-information provisioned by and corresponding to said objects of said plurality of objects not included in said selection; and a capturing part (CP) capturing in a snapshot a representation of said at least one object included in said selection and said meta-information corresponding to said at least one object in said selection and said meta-information corresponding to said objects not included in said selection.

20. The object perception method according to claim 1 further comprising each of said plurality of objects provisioning said perceiving device with said meta-information by broadcasting messages containing said meta-information.

* * * * *